(12) United States Patent
Nir

(10) Patent No.: US 6,704,699 B2
(45) Date of Patent: Mar. 9, 2004

(54) LANGUAGE ACQUISITION AIDE

(76) Inventor: Einat H. Nir, 20 Kohmemiut St., 48039 Rosh Ha'Ayin (IL)

( * ) Notice: Subject to any disclaimer, the term of this patent is extended or adjusted under 35 U.S.C. 154(b) by 116 days.

(21) Appl. No.: 09/946,391

(22) Filed: Sep. 6, 2001

(65) Prior Publication Data

US 2002/0029146 A1 Mar. 7, 2002

Related U.S. Application Data

(60) Provisional application No. 60/229,794, filed on Sep. 5, 2000.

(51) Int. Cl.$^7$ .............................................. G06F 17/27
(52) U.S. Cl. .................... 704/2; 704/4; 704/9; 704/270
(58) Field of Search ............................. 704/2, 9, 4, 10, 704/270, 271, 277; 382/187, 114; 707/531

(56) References Cited

U.S. PATENT DOCUMENTS

| | | | | |
|---|---|---|---|---|
| 5,418,717 A | * | 5/1995 | Su et al. .......................... | 704/9 |
| 5,701,497 A | * | 12/1997 | Yamauchi et al. ........... | 395/753 |
| 6,085,162 A | * | 7/2000 | Cherny ........................ | 704/277 |
| 6,115,482 A | * | 9/2000 | Sears et al. ................. | 382/114 |
| 6,208,435 B1 | | 3/2001 | Zwolinski | |
| 6,218,964 B1 | | 4/2001 | Ellis | |
| 6,289,304 B1 | * | 9/2001 | Grefenstette .................... | 704/9 |
| 6,393,443 B1 | * | 5/2002 | Rubin et al. ................. | 707/533 |
| 6,396,951 B1 | * | 5/2002 | Grefenstette ................ | 382/187 |

OTHER PUBLICATIONS

Byte talk, "Translation Pen Lacks Practicality," Robert Macholl, Byte Magazine, Jan. 1998.

"The Best Pen Doesn't Just Write . . . it Reads!" IRISPen www.enw–ltd.com/frispen.htm, downloaded on Aug. 8, 2000.

IRISPen Executive ™ www.irislink.com/UK/Products/IRISPen/ipexe.html downloaded on Aug. 6, 2000.

Electronic Dictionary and Translator Language Teacher by Ectaco Inc. The Language Teacher 200 Pocket Electronic Dictionary, www.ectaco.com/news downloaded on Aug. 6, 2000.

Speech Synthesis Systems, www.cs.bham.ac.uk/~jpi/museum.html, downloaded on Jul 25, 2000.

The Festival Speech Synthesis System, www.cstr.ed.ac.uk/projects/festival/ downloaded on Jul. 25, 2000.

The Lycos Network search for "Speech Synthesis," downloaded on Jul. 25, 2000.

Automatic Computer Translation, www.lingolex.com/translationsoftware.htm, downloaded on Aug. 6, 2000.

Globalink "Talk to me" Software, User's Guide, Version 3.0, Copyright, 1997.

Gildea, P. M. and Miller, G. A., How Children Learn Words, Scientific American, Sep., 1987, p. 86.

* cited by examiner

Primary Examiner—Susan McFadden
(74) Attorney, Agent, or Firm—Einat Nir

(57) ABSTRACT

A stand-alone, hand-held apparatus is provided, which combines elements of a scanning dictionary with an automatic-translation software, for in-context translation. Additionally, the apparatus may include a text-to-speech synthesis, for in-tandem exposure to spoken and translated forms of a portion of text, such as a clause, a sentence, or a few sentences. A whole document may thus be read, for example, sentence by sentence. The apparatus may further be used for teaching correct pronunciation of any portion of text, by recording the user's pronunciation of the portion of text and comparing it with a text-to-speech synthesis produced by the apparatus.

22 Claims, 14 Drawing Sheets

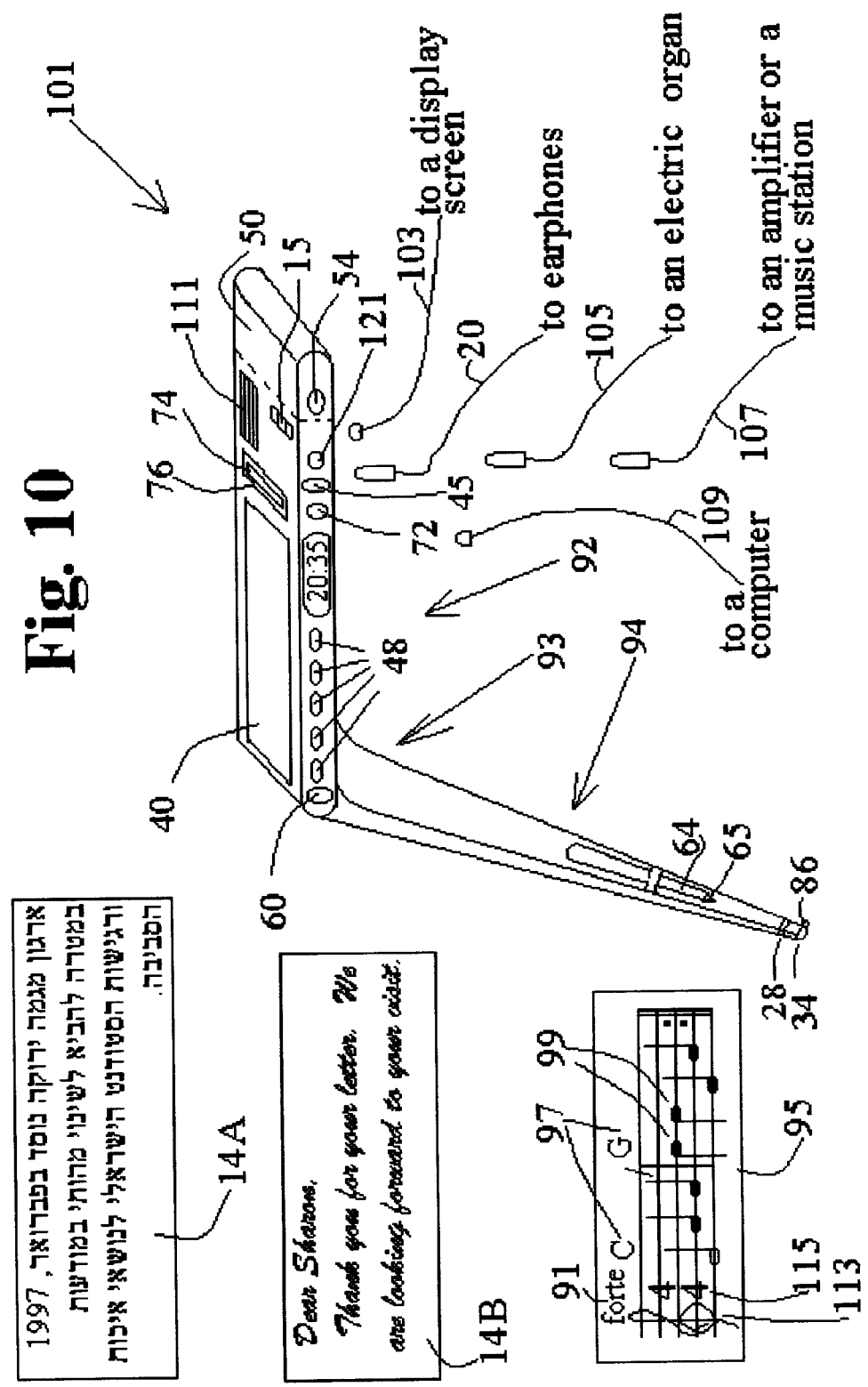

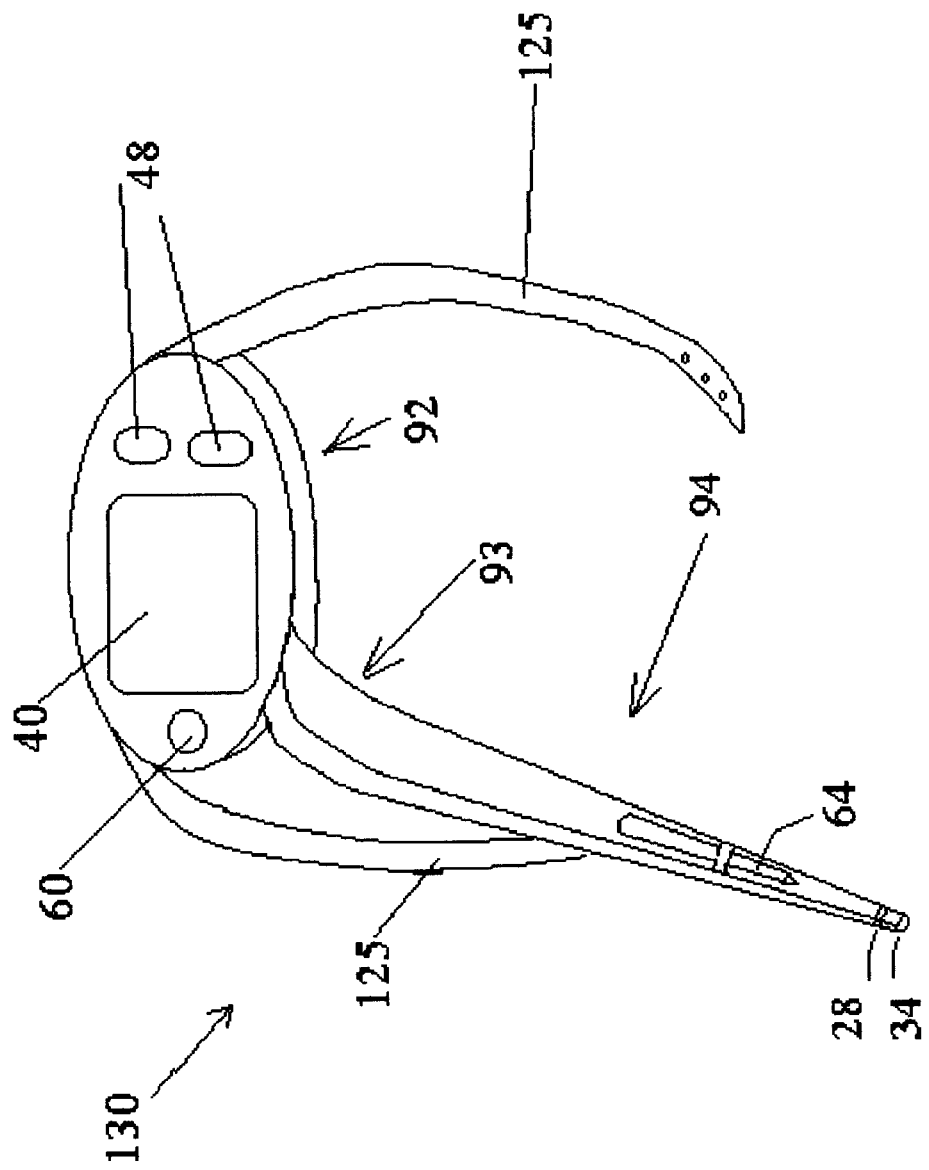

LANGUAGE ACQUISITION AIDE

FIELD OF THE INVENTION

The present invention relates generally to hand-held scanning dictionaries, and in particular, to a scanning dictionary that is optimized for teaching languages.

BACKGROUND OF THE INVENTION

While dictionaries provide multiple meanings to words or word stems, a dictionary user requires the meaning in context and is to sort and shift for himself from the plurality of meanings suggested to him. To students of a foreign language, this is not an easy task. Often, the meaning depends on the part of speech a word plays, but to analyze a sentence for its parts of speech, one must understand it sufficiently. For example, when confronted with, "Name two reasons for the strength of the present economy," many students of English as a Foreign Language will gaze at what, in their view, is a sentence with no verb. Since student rarely look up words they believe they know, they are unlikely to look up "name" for a possible unfamiliar meaning.

An additional difficulty with using a dictionary is that often, a dictionary provides only the word stem, which may be, for example, a verb, and not the word as it appears in the sentence, which may be, for example, an adjective. For example, the meaning in context, for the phrase "augmented costs" may not be found in a dictionary.

An old-fashioned language teaching method, known in Aramaic as "Shnaiim Mikra Ve'ahad Targum," or, "read, translate, read" is designed to provide the meaning in context, averting the problems associated with independent study with a dictionary. However, it requires a teacher, close at hand.

Another problem that students of a foreign language encounter is pronunciation. When a person who was raised in a specific system of sounds and vowels moves into a different system, his difficulty is twofold: not only can he not pronounce the new sounds and vowels, but often, he does not hear their distinguishing features. A person whose mother tongue has a single "e" sound, may not hear the difference between "it" and "eat". Yet, being able to hear this difference is a prerequisite to producing it.

Furthermore, written languages rarely provide unequivocal information with regard to pronunciation. In English, for example, there is "home," and "dome," but "come," and "some." There is "weight," and there is "height". The word "misled" is not pronounced like the word "fiddled," and the word "ear" is not pronounced like the word "bear." There are silent letters like "g" in "paradigm" or "c" in scintillation. For students of a foreign language, pronouncing what they read may involve considerable guesswork.

SURVEY OF PRIOR ART

Optical scanners are known. They convert objects such as pictures, barcodes, or portions of text to machine-readable data signals. Typically, the data signals are read by a user's computer to reproduce an image of the scanned object on a display device, such as a CRT, a display screen or a printer.

A hand-held optical scanner is manipulated by hand across the object that is being scanned. The hand-held scanner may be connected directly to the user's computer by a data cable, and may transfer image data to the computer as he data are collected. Alternatively, the hand-scanner may be a stand-alone unit and may include a data storage component for storing the image data. The data may be downloaded to a separate computer after the scanning operation is complete.

A hand-held optical scanner generally includes an illumination system, for illuminating the region to be scanned, an optical system, for collecting and focusing light reflected by the illuminated, scanned region, a photosensitive detector, for detecting the light collected and focused thereon by the optical system, an analog amplifier, for amplifying the signals produced by the photosensitive detector, and an analog-to-digital converter, for converting the amplified signals to digitized machine-readable data signals. The illumination system may be, for example, a fluorescent or incandescent lamp or an array of light emitting diodes (LEDs). The optical system may include a lens or a lens-and-mirror assembly.

The photosensitive detector is generally a Charge-Coupled Device (CCD). A CCD includes an array of photosensitive cells, or pixels, each pixel collecting an electrical charge responsive to the light that falls upon it. Thus, a CCD may be used to detect light and dark spots of a scanned object. The charge from each pixel is converted to an analog voltage by an analog amplifier, and the analog voltage is digitized by an Analog-to-Digital Converter (ADC). The digitized signals are the machine-readable data signals, which can be stored or processed by the user on a computer or a similar device.

Sometimes, a Contact Image Sensor (CIS) is used in place of the CCD. In a CIS scanner, the array of photosensitive cells is arranged in close proximity to the object to be scanned, so as to catch the reflected light directly; an optical system is not necessary.

U.S. Pat. No. 5,996,895 to Heiman, et al, incorporated herein by reference, describes a scanning system with adjustable light output and/or scanning angle.

U.S. Pat. No. 6,033,086 to Bohn, incorporated herein by reference, describes a compact illumination system for a hand-held scanner.

U.S. Pat. No. 5,841,121 to Koenck, incorporated herein by reference, describes a hand-held optical scanners, having automatic focus control, for operation over a range of distances.

U.S. Pat. No. 5,019,699 to Koenck, incorporated herein by reference, describes a hand-held optical scanner, which includes a lens system having circular symmetry. The lens system focuses the full width of the object onto an array of photosensitive cells, with a single flash of a ring-type xenon flash tube, which surrounds the lens system and is symmetrically arranged relative to the optical axis. In this way, the object can be scanned at any angle relative to the array of photosensitive cells, and the scanned image, stored in digital form, can be electronically rotated to a desired orientation, before it is decoded.

U.S. Pat. No. 5,834,749 to Durbin, incorporated herein by reference, describes a hand-held scanner for reading images at oblique angles, in order for the scanning unit not interfere with the user's view of the scanned image. The distortion to an obliquely scanned image, arising from the oblique scanning, can be corrected by any of several correction techniques, as follows:

1. a ratio of vertical to horizontal line densities of the array of photosensitive cells can be chosen to compensate for the vertical foreshortening of the scanned image;
2. the array of photosensitive cells can be oriented at an oblique angle with respect to the optical axis, to compensates for the distortion inherent in the oblique scanning;

3. a lens system can be configured to provide varying degrees of magnification along its surface; and
4. as taught by U.S. Pat. No. 5,019,699, to Koenck, described hereinabove, processing techniques can electronically re-orient the scanned image after storing it in the scanner's memory.

Hand-held, stand-alone, optical scanners that produce audio output are known. U.S. Pat. No. 5,945,656 to Lemelson, et al, incorporated herein by reference, describes a pen-like stand-alone scanner for transuding coded data into pre-coded pieces of speech or music. Generally, a scanning guide is attached to a book, arranged for guiding the pen-like scanner vertically along an edge of the book, which contains coded information. Aided by the guide, children may scan the coded data and produce the sounds associated with them.

U.S. Pat. No. 5,767,494 to Matsueda, et al., incorporated herein by reference, describes a system for reproducing multimedia information, recorded with an optically readable code. The code is a dot-code format described in U.S. Ser. No. 08/407,018 (PCT Publication No. WO 94/08314), and includes two-dimensional patterns that convey multimedia information, for example, audio information like speech and music, image information obtained from a camera or a video device, and digital code data obtained from the user's computer, for example, from a word processor. The system uses paper as a basic information-storage medium for the optically readable code, and includes a preferably pen-like scanner, arranged to read the code. The system may reproduce the original multimedia information by an appropriate hardware such as a display screen, a printer, or a speaker, and includes a speech synthesizer. In some embodiments, the pen-like scanner is a stand-alone unit, and may include earphones.

The IRISPen of Image Recognition Integrated Systems Inc., of Rue Du Bosquest 10, 1348 Louvain-la-Neuve, Belgium, is a pen-like scanner that allows the user to scan text, bar codes and handwritten numbers into any Windows or Mac application. The IRISPen is hooked up to any desktop or portable computer without any additional interface boards. The IRISPen is not stand-alone apparatus.

The IRISPen Executive™ integrates text-to-speech technology from Lernout & Hauspie, in six languages (English, French, German, Dutch, Spanish and Italian). It provides natural audio feedback of all recognized words and numbers as it scans the information. The purpose of the text-to-speech technology is to reduce the need of the user to keep his eyes on the computer screen to verify recognition. The IRISPen Translator is further arranged to automatically translate text between English and German. Output may be in the form of written text in the translated language, displayed on a computer screen or printed. Alternatively, the output may be an audio output, in the translated language.

The IRISPen Executive™, the IRISPen Translator, and other IRISPen products are not stand-alone apparatus. Rather, they are arranged to operate with a computer, such as a desktop PC or a notebook computer, into which the IRISPen software has been installed. The output language is the language that has been installed to the computer, and cannot be changed during a scanning operation—an audio output may be provided only in the original language or only in the translated language. Furthermore, the automatic translation language is not intrinsic to the IRISPen Translator. Rather, it has to be installed to the computer that supports the IRISPen. Neither are the speaker or earphones for audio output intrinsic to the IRISPen. Instead, the computer speakers are used for the audio output. Therefore, the IRISPen is not a single product but a package of several products, which are sold together and are arranged to operate together.

Text-to-speech (TTS) syntheses, additional to the technology of Lemout & Hauspie of the IRISPen Executive™, are known. Bell Labs and Edinburgh University have developed a text-to-speech synthesis based on a Spoken Text Markup Language (STML) standard. STML later became SABLE. Sun Microsystems, Inc., in partnership with other speech-technology companies, has worked to define the specifications for a Java Speech API and a Java Speech Markup Language (JSML), incorporating many of the aspects of SABLE. JSML has been accepted by W3C (the organization responsible for WWW standards) as a standard. Bell Labs Lucent Technologies now offer a text-to-speech synthesis, which provides choices between voices of a man, a woman or a child and a speech rate that is fast, normal or slow. The University of Edinburgh has developed a generally multi-lingual system known as The Festival Speech Synthesis System, available in English (British and American), Spanish and Welsh. Additionally, Digital offers the DECtalk™ Speech Synthesizer which converts ASCII text to natural-sounding speech output. IBM offers the V5.1 speech synthesizer. Apple offers "English Text-to-Speech" software with recent versions of the MacOS. The University of York has produced YorkTalk, Oxford University offers an all-prosodic speech synthesizer entitled, IPOX. Telcordia Technologies (formerly Bellcore) have developed the ORATOR and an improved version, the ORATOR II. Entropic Research Laboratory, Inc. offers TrueTalk 1.0, a software-only text-to-speech system based on a major research effort at AT&T Bell Laboratories. AT&T has developed Next-Generation TTS to convert machine-readable English text into audible speech. The Speech Technology Unit at BT has produced, and is continuing to develop, a sophisticated text to speech system called Laureate. Eurovocs is still another commercially available, text-to-speech product. BORIS is a high-quality, diphone-based text-to-speech converter for Spanish, developed by Universidad Politecnica de Madrid. Lycos Search offers a text-to-speech synthesizer, as do SoftVoice, Inc., Eloquent Technology, Inc., and many other companies.

Lernout & Hauspie, which developed the technology of the IRISPen Executive™, described hereinabove, offers a multi-lingual, text-to speech system in British English, Dutch, French, German, Italian, Japanese, Korean, Portuguese (Brazilian), Russian and Spanish.

HMM-Based Trainable Speech Synthesis has developed a speech synthesis which uses a set of decision-tree state-clustered Hidden Markov Models. The system automatically selects and segments a set of HMM-state sized sub-word units from a continuous-speech database of a single speaker for one hour for use in a concatenation synthesizer, to produce highly intelligible, fluent speech. It can be retrained on a new voice in less than 48 hours.

Automatic translation, additional to the technology of the IRISPen Translator, are known. For example, Language Teacher® of Ectaco, 1205 E. Pike, Seattle, Wash. 98122, is a pocket, electronic dictionary and translator with 2 million words and phrases, which generally operates as a stand-alone unit. Some models may be connected to user's computers and interact with Windows 95 or 98. It is available for translation between English and any of the following languages: Albanian, Arabic, Bulgarian, Chinese, Czech, French, German, Greek, Hebrew, Hungarian, Italian, Latvian, Polish, Portuguese, Romanian, Russian, Serbo-Croatian, Spanish, Turkish, Vietnamese, and Yiddish.

The Language Teacher® includes words as well as phrases, idioms, irregular verbs, and linguistic games and grammar. If further includes a built-in, voice synthesizer which produces an audio output in multiple languages. Additionally, the Language Teacher® includes an organizer. A digital voice recorder stores up to 15 minutes of human speech. Its model "Partner®" is designed to translate texts, and send and receive e-mail and faxes.

There is a wide selection of automatic translation software, for example, Deluxe Universal Translator, of LanguageForce, Easy Translator 3, of Transparent Language, L&H Power Translator Pro, of L&H Speech Products, and Translation Manager 2.0, of IBM.

Software for correcting the user's pronunciation is known. For example, "Talk to Me™, by Globalink, Inc., Fairfax, Va., is a software, arranged for a PC computer. The user may use the software to listen to a dialogue and to try to reproduce it. The software records the user's voice and compares its signals with those which would be produced by a native speaker, displaying to the user the differences in signal forms. However, the dialogues are provided by the software; the user cannot use the software to practice on sentences of his choice, for example, in order to prepare for a speech that he is to give.

SUMMARY OF THE INVENTION

The present invention relates to stand-alone, hand-held, scanning apparatus, which provides a user with exposures to a spoken form and an interpretation of a portion of text, simultaneously, or in sequence.

In accordance with a preferred embodiment of the present invention, the apparatus provides a text-to-speech synthesis of a portion of text, for example, a sentence, followed by an audible, automatic translation to a second language, of the same portion of text. Alternatively, the automatic translation may be displayed in parallel with the text-to-speech synthesis.

In accordance with other embodiments, interpretation includes translation of difficult words and phrases, in context, upon request, or rephrasing of difficult words and phrases, in context, upon request. These may be audible or displayed.

Alternatively, or additionally, the stand-alone, hand-held apparatus may be used for teaching correct pronunciation of a portion of text. Preferably, teaching correct pronunciation includes the steps of providing a text-to-speech synthesis of the portion of text, recording the user's pronunciation of the portion of text, and playing back the user's pronunciation, for the user to hear any differences between his pronunciation and that of the text-to-speech synthesis.

Additionally, in accordance with the present invention, the stand-alone, hand-held apparatus may be used for synthesizing written notes of a piece of music. Preferably, the music is synthesized in the sound of a desired instrument, for example, a cello. The user, who may be preparing to play the piece of music, may maintain visual contact with the written notes, as they are being synthesized.

BRIEF DESCRIPTION OF THE DRAWINGS

The present invention will be more clearly understood from the accompanying detailed description and drawings, in which same number designations are maintained throughout the figures for similar elements and in which:

FIG. 10 schematically illustrates apparatus for language acquisition, in accordance with the present invention; and FIG. 11 schematically illustrates apparatus for language acquisition, in accordance with an alternate embodiment of the present invention.

DETAILED DESCRIPTION OF PREFERRED EMBODIMENTS

Figure 1:
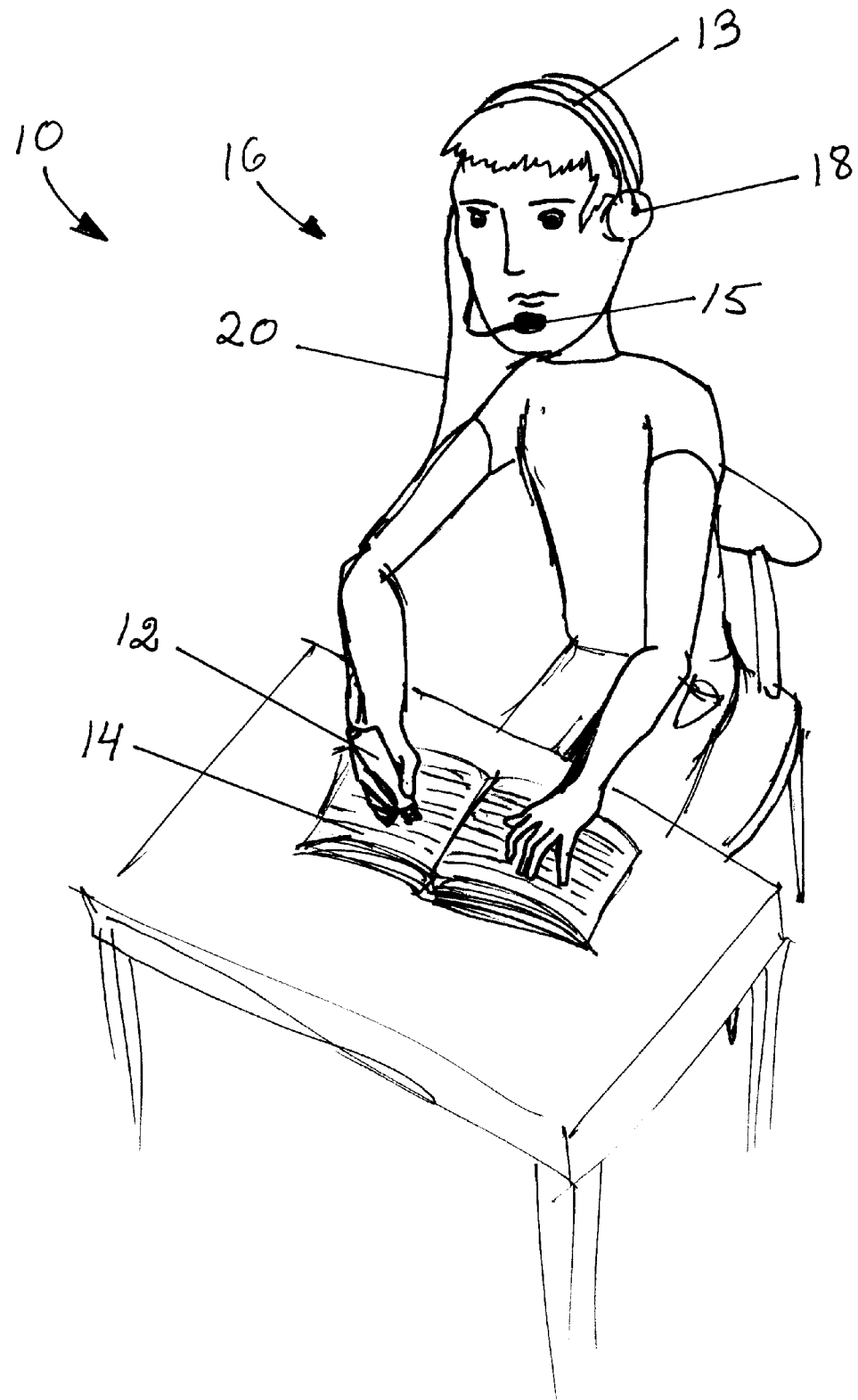
FIG. 1 schematically illustrates apparatus for language acquisition, in accordance with a preferred embodiment of the present invention.

Reference is now made to FIG. 1, which schematically illustrates apparatus 10 for language acquisition, in accordance with a preferred embodiment of the present invention. Preferably, apparatus 10 provides audio outputs of automatic text-to-speech synthesis of a portion of text 14, in a first language, and preferably also automatic translation to a second language, while enabling a user 16 to maintain visual contact with text 14. Preferably, apparatus 10 includes a device 12, hand-held by user 16, a cable 20, and earphones 18, which are worn by user 16, as a headgear 13. As user 16 moves hand-held device 12 across text 14, he hears text 14 read aloud to him and preferably also automatically translated, through earphones 18. However, in some embodiments of the present invention, cable 20 is not used, and communication between device 12 and earphones 18 is wireless.

Preferably, user 16 is a native speaker of the second language, eager to be exposed simultaneously to text 14 in its written and spoken forms, and to its interpretation. Preferably, apparatus 10 offers several reading and translations protocols for user 16 to choose from, as will be described hereinbelow, in conjunction with FIGS. 3–5.

Alternatively, user 16 is a native speaker of the language of text 14, learning to read the language of text 14 through simultaneous exposure to its written and spoken forms. Preferably, user 16 is aided by a built-in dictionary, for rephrasing unfamiliar words and phrases with familiar ones, upon request, as will be described hereinbelow, in conjunction with FIG. 6.

Alternatively or additionally, apparatus 10 may include a pronunciation teaching program and a microphone 15 into which user 16 reads aloud text 14, after hearing it read to him by apparatus 10, as will be described hereinbelow, in conjunction with FIG. 7. Microphone 15 may be mounted on headgear 13, and may be further used to communicate with apparatus 10, via voice commands.

Alternatively or additionally, apparatus 10 may include a notes-to-music synthesis, for providing an audio output of a written music passage. User 16 may be a music student, preparing to play a musical piece and assisted by listening to apparatus 10, as it produces an audio output of the written music, as will be described hereinbelow, in conjunction with FIG. 8.

Figure 2A:
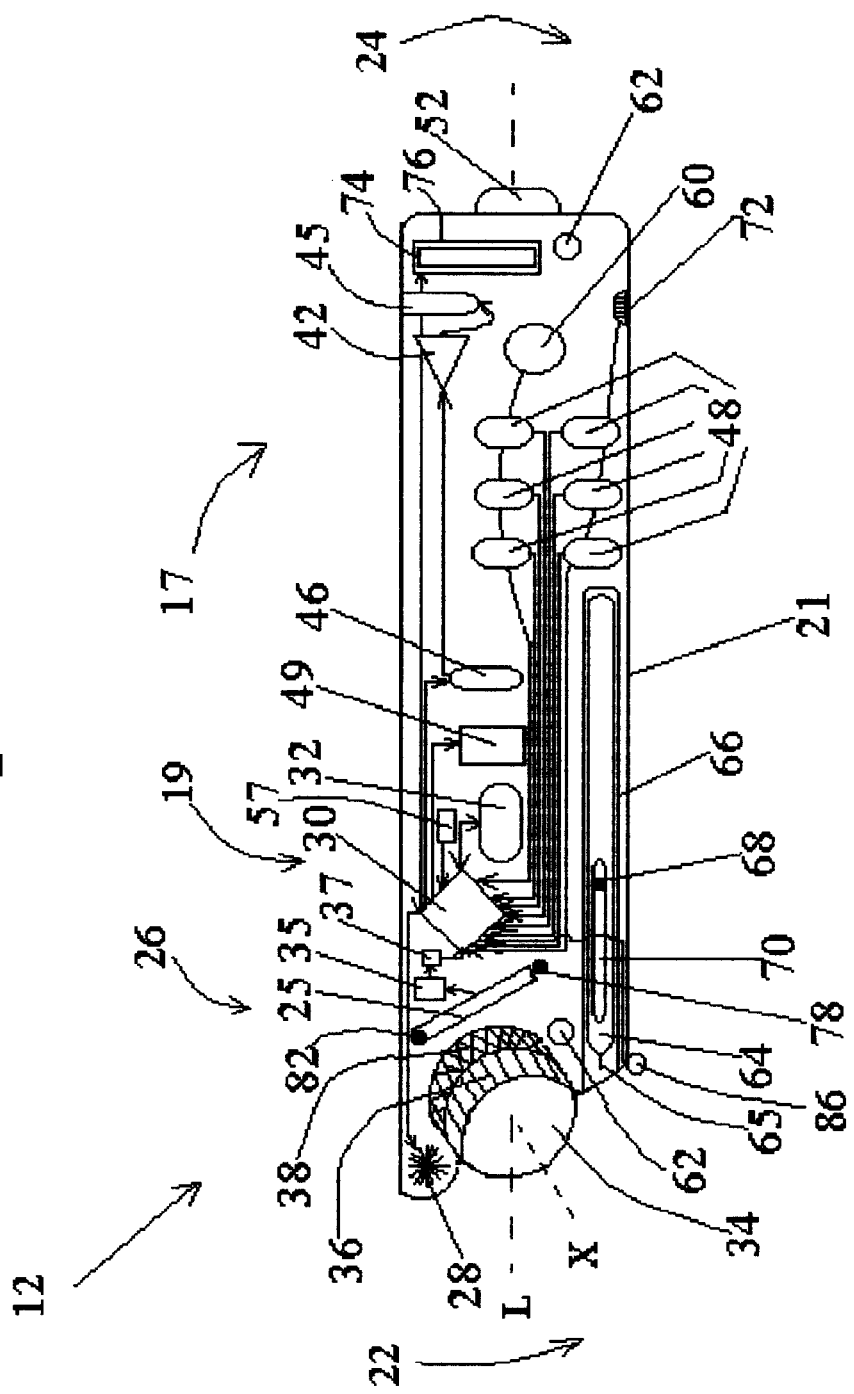
FIG. 2A schematically illustrates the internal elements of the apparatus of FIG. 1, in accordance with the preferred embodiment of the present invention.
Figure 2B:
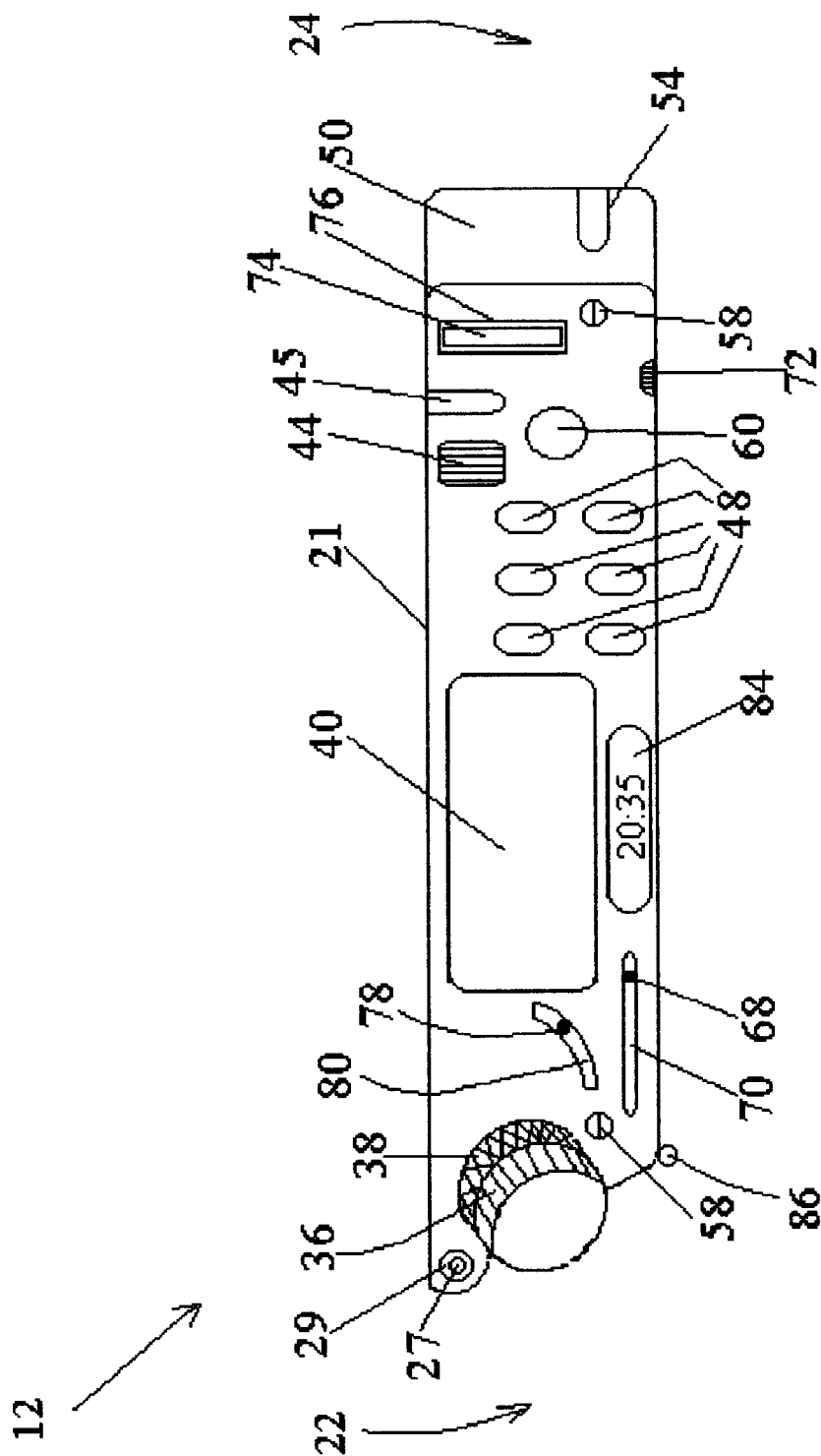
FIG. 2B schematically illustrates the external elements of the apparatus of FIG. 1, in accordance with the preferred embodiment of the present invention.

Reference is now made to FIGS. 2A and 2B, which schematically illustrate internal and external structures, respectively, of hand-held device 12, in accordance with the preferred embodiment of the present invention. Hand-held device 12 includes an outer sheath 21, formed of a rigid material such as wood or plastic, having a proximal end 22 and a distal end 24, with respect to text 14 (FIG. 1), and a longitudinal axis L. Hand-held device 12 further includes a scanner 26, located at proximal end 22 and a computerized system 19. Scanner 26 is arranged for scanning a single line of text at a time. Preferably, user 16 scans text 14 in grammatical units such as a sentence, a clause, a phrase, or a word.

Additionally, hand-held device 12 may include a display drive 49 and a display panel 40 for providing communication between computerized system 19 and user 16. Display panel 40 may be a touch panel, wherein user 16 may touch it with a soft tip (not shown) to activate certain features, or to respond to queries of computerized system 19. Additionally, device 12 may include at least one key 48, and preferably a plurality of keys 48, for supplementing the communication between computerized system 19 and user 16. Keys 48 may be used, for example, to specify a reading protocol, or to request a translation or rephrasing of a word or phrase, when the reading protocol is based on a key request. Display panel 40 and keys 48 may have additional functions, as will be described hereinbelow.

Preferably, scanner 26 of hand-held device 12 includes an illumination system 28, for illuminating text 14, an optical system 34, for collecting and focusing light reflected from text 14, a photosensitive detector 25, preferably an array of CCD cells, for detecting the light collected and focused thereon by optical system 34, an analog amplifier 35, for amplifying the signals produced by photosensitive detector 25, and an analog-to-digital converter 37, for converting the amplified signals to digitized machine-readable data signals.

Illumination system 28 may be, for example, a fluorescent or incandescent lamp or an array of light emitting diodes (LEDs). Illumination system 28 may be arranged as substantially a point light source, or as a ring, surrounding optical system 34. In an embodiment of the present invention, light output and illumination angle are adjusted, for example, as taught by U.S. Pat. No. 5,996,895 to Heiman, et al, incorporated herein by reference. In an alternate embodiment of the present invention, a compact illumination system, for example, as taught by U.S. Pat. No. 6,033,086 to Bohn, incorporated herein by reference, is used. Preferably, the intensity of the illumination and the diameter of the illumination beam are controlled by knobs 27 and 29, respectively. Alternatively, the intensity of the illumination and the diameter of the illumination beam are controlled by at least one of keys 48, through computerized system 19, as will be described hereinbelow.

Optical system 34 may include a lens or a lens-and-mirror assembly. Optical system 34 defines an optical axis X, which may be parallel with longitudinal axis L, or arranged at an angle to it, depending on the specific arrangements of the other elements of device 12. For example, optical axis X may be perpendicular to longitudinal axis L, as taught by U.S. Pat. No. 5,767,494 to Matsueda, et al., incorporated herein by reference.

Preferably, optical system 34 has a focusing capability, for operation over a range of distances. Preferably, optical system 34 has an automatic focusing capability, in a manner similar, for example, to U.S. Pat. No. 5,841,121 to Koenck, incorporated herein by reference. Alternatively, user 16 may use a focusing ring 36 to bring an image of text 14, on photosensitive detector 25, into focus. Preferably, display panel 40 may be arranged for displaying text 14 as photosensitive detector 25 sees it, via at least one key 48, thus enabling user 16 to bring an image of text 14 into focus. In an alternate embodiment of the present invention, focusing is controlled by one of keys 48, through computerized system 19. In a still alternate embodiment of the present invention, optical system 34 is arranged as a fixed, free focus optical system, having a depth of field that maintains text 14 within focus for most applications.

Preferably, optical system 34 further includes a zooming capability, for operation over a range of print sizes of text 14. Preferably, user 16 may use a zooming ring 38 to zoom optical system 34 in and out, assisted by display panel 40. Alternatively, zooming may be performed automatically. Alternatively, zooming may be controlled by at least one of keys 48, through computerized system 19.

In an alternate embodiment of the present invention, optical system 34 is not used. Rather, photosensitive detector 25 includes a CIS array of photosensitive cells, arranged in close proximity to text 14, so as to catch the reflected light directly.

Computerized system 19 includes a processor 30, which preferably includes a control unit, a logic unit (ALU) and memory. Additionally, computerized system 19 may include a fixed data storage device 32, such as a hard disk.

Additionally, computerized system 19 includes an operating system, such as windows 95, windows 98, or windows 2000. Preferably, computerized system 19 further includes an object-oriented compiler, such as C++ or Java, which includes a linker for compiling an exec. file for several known applications. Alternatively, multithreading is used for running several applications in parallel.

Furthermore, computerized system 19 includes an OCR program of a first language and a text-to speech synthesizer of the first language. Preferably, computerized system 19 further includes automatic translation software between the first language and a second language. Additionally in accordance with the preferred embodiment of the present invention, computerized system 19 includes a dictionary in the first language, for rephrasing words or phrases in the first language to more common or more familiar words and phrases. Preferably, the applications are associated as necessary, for providing sequential outputs. Alternatively multithreading may be used for providing an audio output, in parallel with a visual display.

In some embodiments of the present invention, apparatus 10 may be arranged for automatic translation to more than one second languages, for example, from English to French and from English to Spanish. Computerized system 19 will include automatic translation software from English to each of the second languages. Additionally, apparatus 10 may be arranged as a two-way language-acquisition aide, for example, performing OCR conversion and text-to-speech synthesis in a first language and automatic translation to a second language, or OCR conversion and text-to-speech synthesis in the second language, and automatic translation to the first language. Thus, computerized system 19 may include more than one OCR programs, text-to-speech syntheses and automatic translation software. Furthermore, a combination of the above may be provided.

Additionally, OCR conversions and text-to-speech syntheses of different languages, dictionaries of these languages, pronunciation teaching software of these languages, and automatic translation software from these languages to other languages, as requested by the user, may be incorporated to computerized system 19. Preferably, when apparatus 10 is arranged to read more than one language, computerized system 19 recognizes a language it is arranged to read automatically.

In accordance with the preferred embodiment of the present invention, a plurality of dictionaries may be provided, for example, a dictionary of the first language, a dictionary of the second language, a dictionary from the first language to the second, a dictionary from the second language to the first, and similarly, for at least one dictionary of professional terms, and for at least one dictionary of special idioms. Additionally, the user may augment and modify the dictionaries. The dictionaries may be used to support the automatic translation, or the rephrasing of difficult words.

In accordance with the present invention, the user may specify the first and second languages from a library of first and second languages for which computerized system 19 is arranged. Additionally, computerized system 19 may be augmented for additional first and second languages.

Preferably, computerized system 19 is arranged to recognize printed matter of various fonts, as well as hand-written matter, in pen, pencil, and other writing instruments. Additionally, computerized system 19 may be arranged to recognize text on a display screen, such as a computer screen.

In accordance with a preferred embodiment of the present invention, hand-held device 12 includes an audio-output system 17, which preferably includes a sound card 46, for producing the audio outputs, and may further include an amplifier 42, for amplifying the audio outputs, and a volume control knob 44, for controlling the volume of the audio outputs. Alternatively, the volume is controlled by at least one of keys 48, through computerized system 19, as will be described hereinbelow. Audio output system 17 further includes an audio jack 45, for connecting cable 20 of earphones 18 (FIG. 1) to device 12.

In accordance with a preferred embodiment of the present invention, keys 48 may be used to select a desired protocol from a library of at least one reading protocol.

Figure 3:
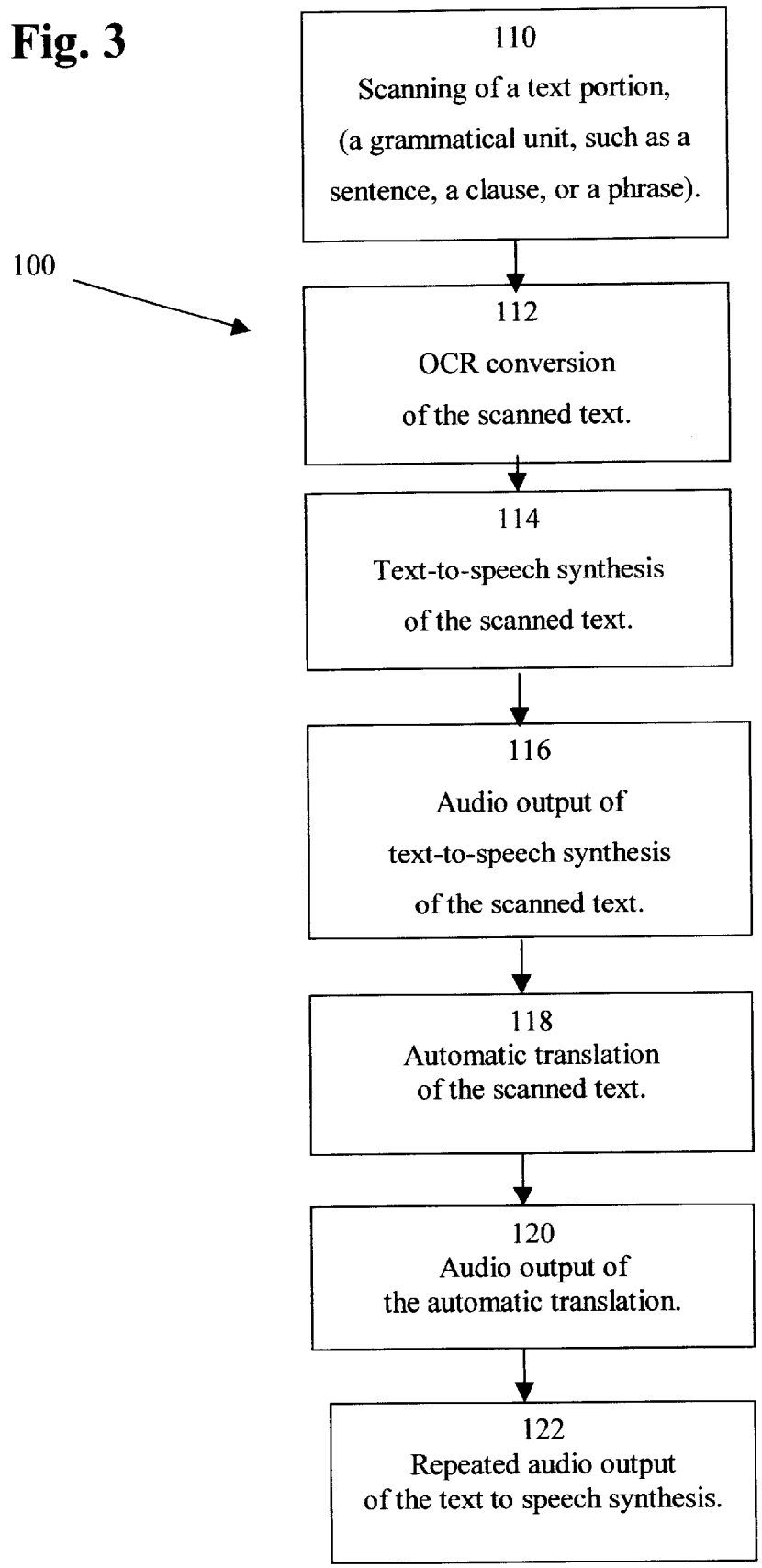
FIG. 3 is a flowchart of a first reading protocol, in accordance with the preferred embodiment of the present invention.

Reference is now made to FIG. 3, which is a flowchart 100 of a first reading protocol using apparatus 10, in accordance with the preferred embodiment of the present invention. The first reading protocol provides reading in the first language—the language of the text, translation to a second language and a repeat of the reading in the first language, as follows:

in box 110, a portion of text is scanned by user 16, preferably, in grammatical units such as by sentence, by clause, or by phrase;

in box 112, computerized system 19 performs OCR conversion to the scanned text portion;

in box 114, computerized system 19 performs text-to-speech synthesis of the scanned text;

in box 116, computerized system 19 provides an audio output of the text-to-speech synthesis;

in box 118, computerized system 19 performs automatic translation of the scanned text;

in box 120, computerized system 19 provides an audio output of the automatic translation; and in box 122, computerized system 19 repeats the audio output of the text-to-speech synthesis.

Figure 4:
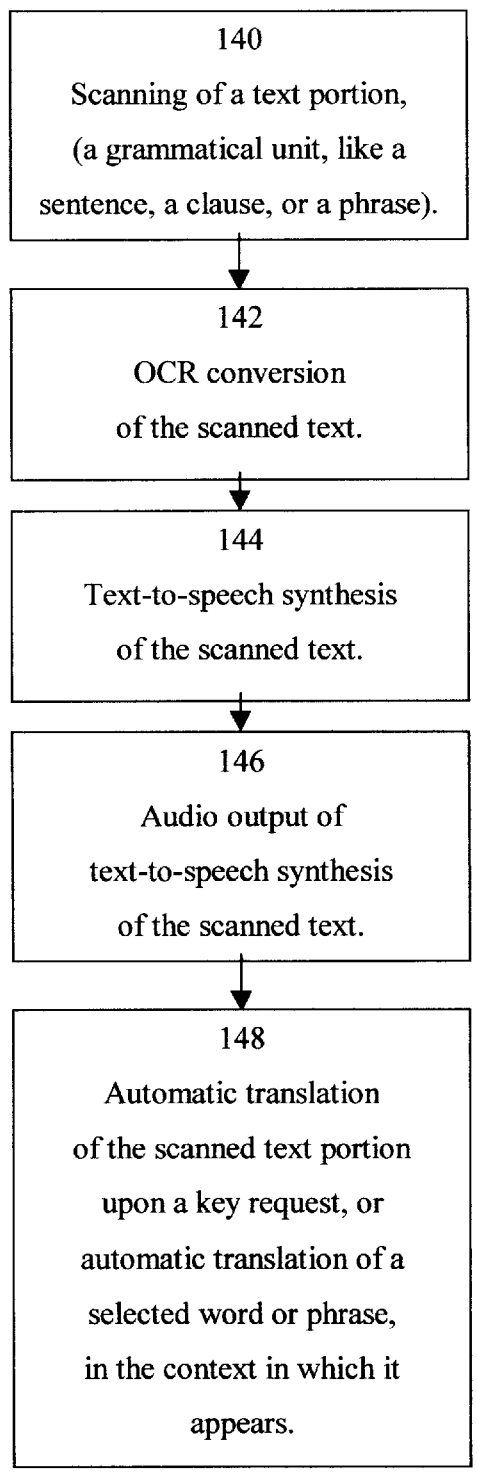
FIG. 4 is a flowchart of a second reading protocol, in accordance with the preferred invention.

Reference is now made to FIG. 4, which is a flowchart 130 of a second reading protocol, using apparatus 10, in accordance with the present invention. The second reading protocol provides reading in the language of the text, and translation upon request, as follows:

in box 140, a portion of text is scanned by user 16, preferably, in grammatical units such as by sentence, by clause, or by phrase;

in box 142, computerized system 19 performs OCR conversion to the scanned text portion;

in box 144, computerized system 19 performs text-to-speech synthesis of the scanned text;

in box 146, computerized system 19 provides an audio output of the text-to-speech synthesis; and in box 148, computerized system 19 performs automatic translation of the scanned text, when user 16 requests it, for example, with a stroke of at least one of keys 48.

Unlike scanning dictionaries, computerized system 19 provides translations of words and phrases in their context, even when user 16 requests the translation of a single word or phrase. For example, the word "added" in the phrase "added cost" will be translated as adjective. However, the word "added" in the sentence, "We have added a few apples," will be translated as a verb.

Figure 5:
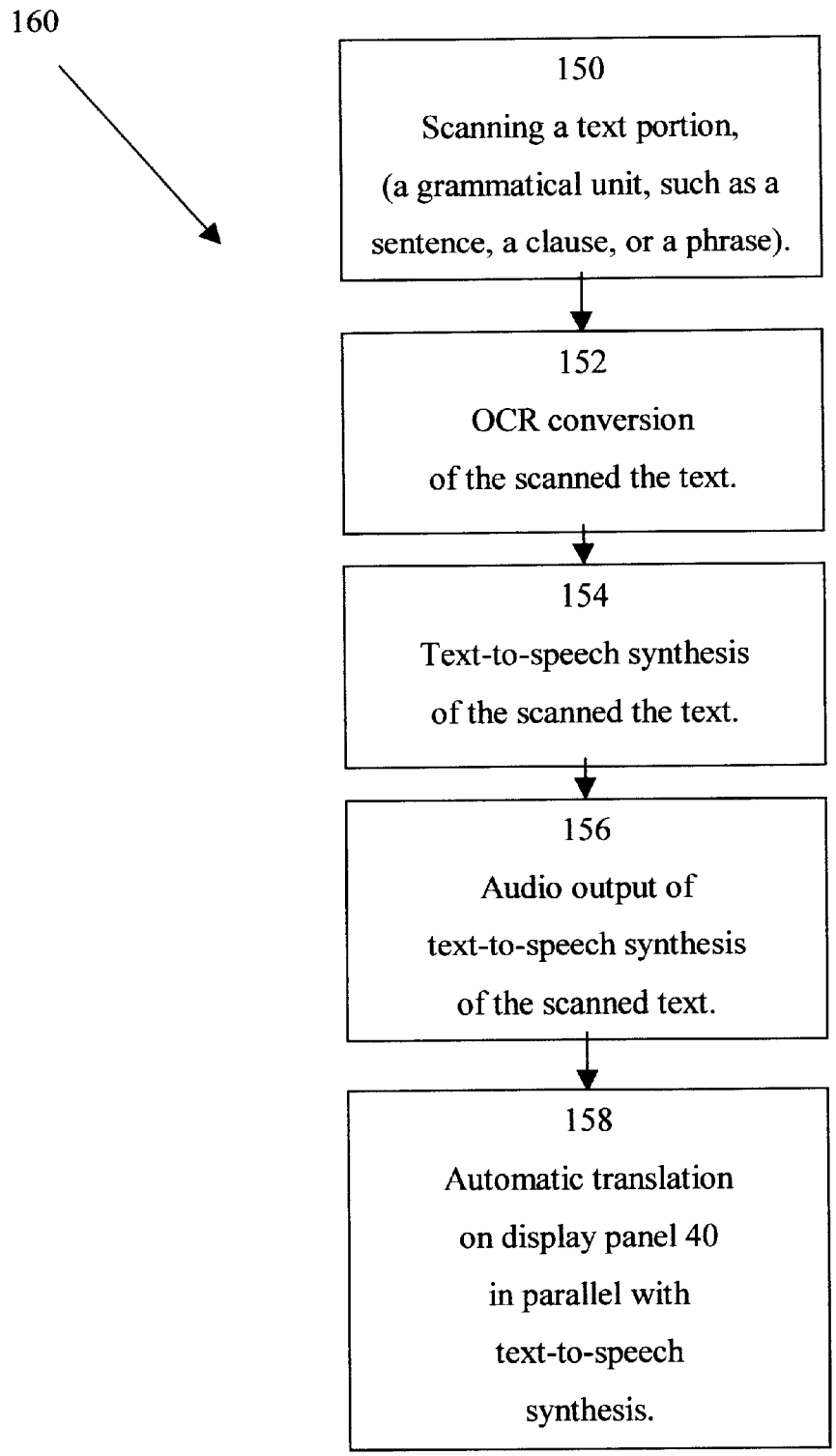
FIG. 5 is a flowchart of a third reading protocol, in accordance with the present invention.

Reference is now made to FIG. 5, which is a flowchart 160 of a third reading protocol, using apparatus 10, in accordance with the present invention. The third reading protocol provides reading in the language of the text, and translation by display, using multithreading to run text-to-speech synthesis and automatic translation, in parallel, as follows:

in box 150, a portion of text is scanned by user 16, preferably, in grammatical units such as by sentence, by clause, or by phrase;

in box 152, computerized system 19 performs OCR conversion to the scanned text portion;

in box 154, computerized system 19 performs text-to-speech synthesis of the scanned text;

in box 156, computerized system 19 provides an audio output of the text-to-speech synthesis; and in box 158, computerized system 19 performs automatic translation of the scanned text, in parallel with the text-to-speech synthesis, and displays the translation of display panel 40.

Figure 6:
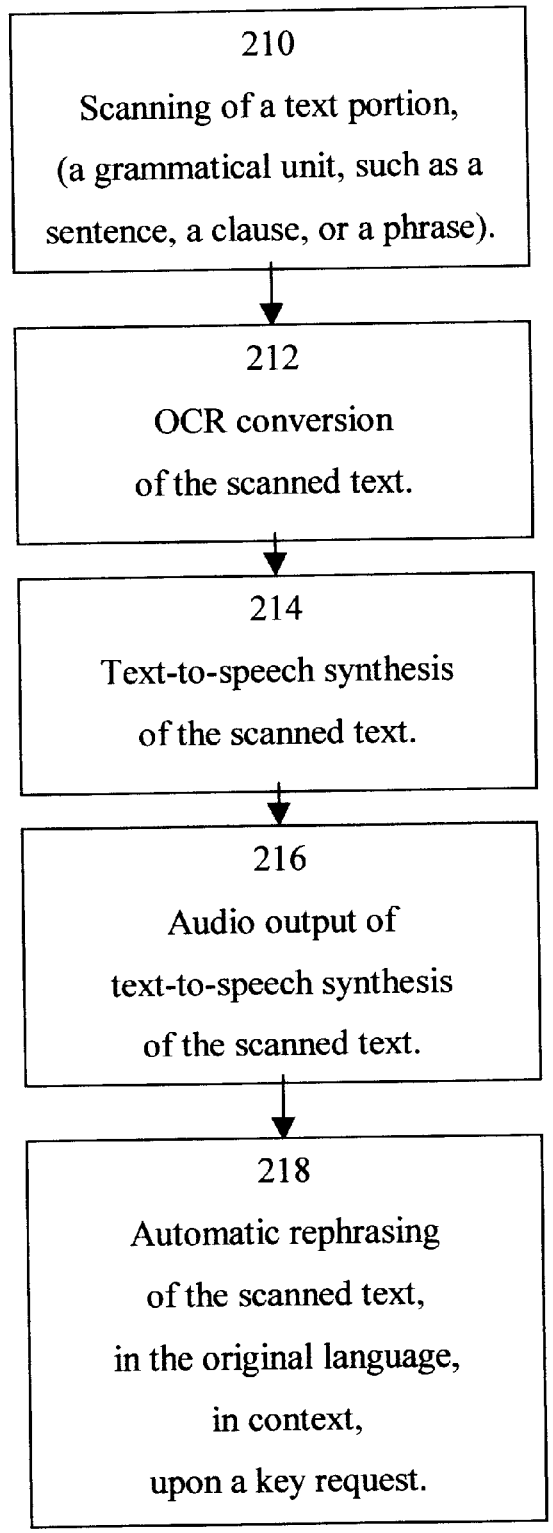
FIG. 6 is a flowchart of a fourth reading protocol, in accordance with the present invention.

Reference is now made to FIG. 6, which is a flowchart 200 of a fourth reading protocol, using apparatus 10, in accordance with the present invention. The fourth reading protocol provides reading in the language of the text, and rephrasing of difficult words, audibly or by display, upon request, as follows:

in box 210, a portion of text is scanned by user 16, preferably, in grammatical units such as by sentence, by clause, or by phrase;

in box 212, computerized system 19 performs OCR conversion to the scanned text portion;

in box 214, computerized system 19 performs text-to-speech synthesis of the scanned text;

in box 216, computerized system 19 provides an audio output of the text-to-speech synthesis; and in box 218, computerized system 19 rephrases difficult words, in their context, audibly or by display, upon a key request.

Figure 7:
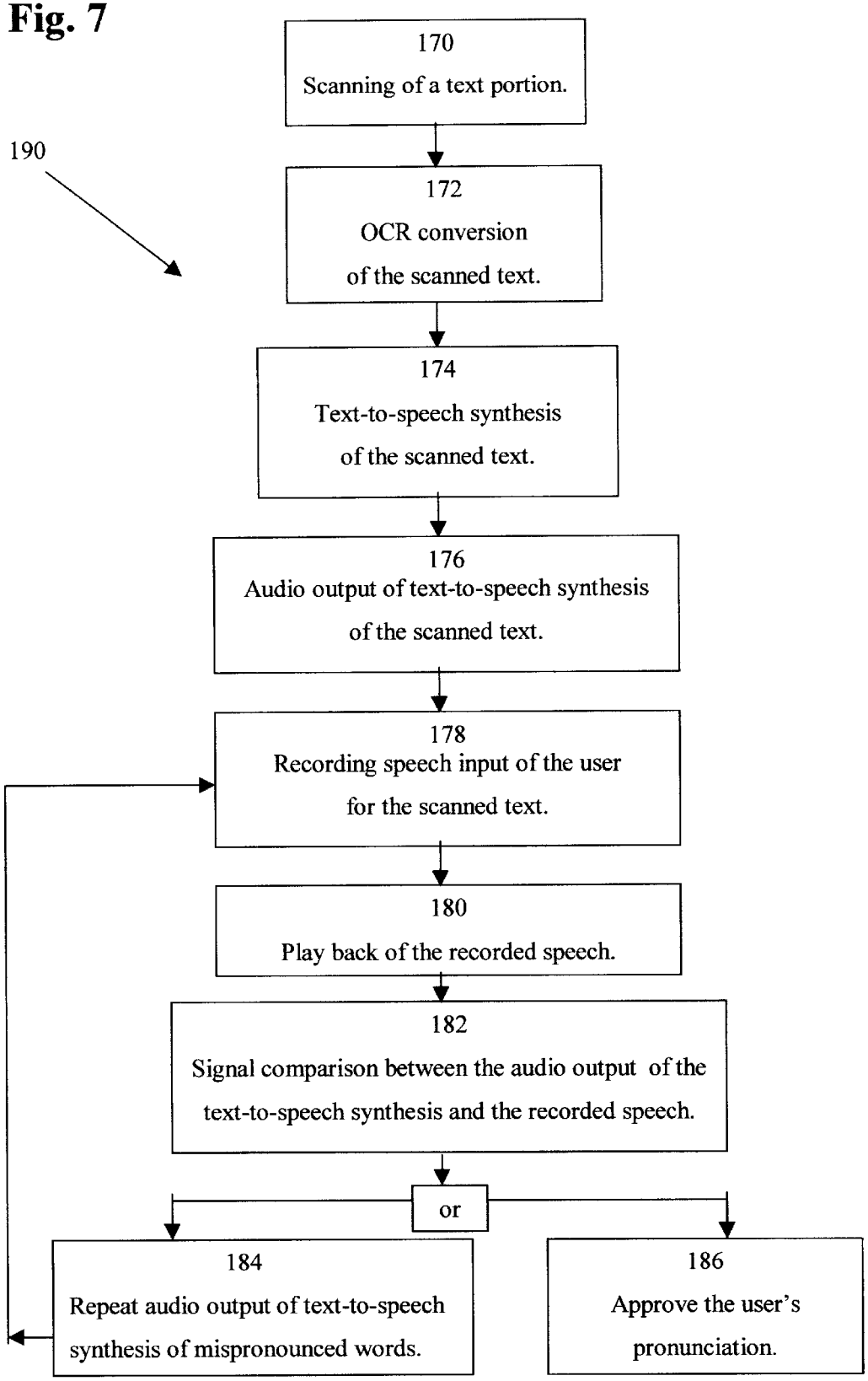
FIG. 7 is a flowchart of a fifth reading protocol, in accordance with the present invention.

Reference is now made to FIG. 7, which is a flowchart 190 of a fifth reading protocol, for teaching correct pronunciation using apparatus 10, in accordance with the present invention. Preferably, user 16 is a native speaker of the second language, eager to learn correct pronunciation of the language of text 14.

Often, when a person who was raised in a specific system of sounds and vowels moves into a different system of sounds and vowels, his difficulty is twofold: not only can he not pronounce the new sounds and vowels, but often, he does not hear their distinguishing features. For example, if an adult who was raised in a language system of six basic vowels moves into a language system of 12 or 20 vowels, then for a long time, he will only hear six basic vowels in the new language system. A person whose mother tongue has only one "e" sound, will hear the difference between "it" and "eat".

The fifth reading protocol of apparatus 10 is designed to teach user 15 to hear and distinguish the sounds of the language system of text 14, and pronounce them correctly. Preferably, user 16 learns correct pronunciation through hearing his own pronunciation played back to him, by apparatus 10, and through comparing it with the text-to-speech synthesis. Alternatively, apparatus 10 may use a signal evaluator of computerized system 19 to compare the pronunciation of user 16 with its own text-to-speech synthesis, and to correct user 16, when necessary. Flowchart 190 of the fifth reading protocol includes the following steps:

in box 170, a portion of text is scanned by user 16, preferably, in grammatical units such as by sentence, by clause, or by phrase;

in box 172, computerized system 19 performs OCR conversion to the scanned text portion;

in box 174, computerized system 19 performs text-to-speech synthesis of the scanned text;

in box 176, computerized system 19 provides an audio output of the text-to-speech synthesis;

in box 178, user 16 records his pronunciation of the portion of text;

in box 180, computerized system 19 plays back the recorded speech of user 16;

in box 182 computerized system 19 compares the recorded speech of user 16 with its own text-to-speech synthesis, using a signal evaluator of computerized system 19;

in box 184, computerized system 19 repeats its audio output of mispronounced words, and directs user 16 to try again; or in box 186, computerized system 19 signals an approves the user's pronunciation.

Alternatively, in box 184 apparatus 10 displays for the user the signal forms of its own text-to-speech synthesis and of the user's speech, for the user to compare.

In this manner, user 16 may practice his pronunciation on any text, including text that he may prepare, unlike known pronunciation systems, which rely on pronunciation practice of words and sentences preselected by the makers of the programs.

Audio outputs of text-to-speech synthesis and automatic translation may be provided at different rates, such as a slow rate, a normal rate, and a fast rate, in a manner similar to the technology of Bell Labs Lucent Technologies, described hereinabove, in conjunction with the survey of prior art. Preferably, the user may select a desired rate, using at least one of keys 48.

Preferably, apparatus 10 includes a library of voices, stored for example in fixed data storage device 32. Audio outputs of text-to-speech synthesis and automatic translation may be provided in different voices, such as a man's voice, a woman's voice, or a child's voice. Additionally, audio outputs may be provided in specific voices, which a user may request, for example, in the voice of Burl Ives or in the voice of Woofy Goldberg. Preferably, user 16 may select a desired voice, using at least one of keys 48.

Alternatively or alternatively, user 16 may train apparatus 10 to a desired voice, using for example, the technology of HMM-Based Trainable Speech Synthesis, which uses a set of decision-tree state-clustered Hidden Markov Models, described hereinabove, in conjunction with the survey of prior art.

Alternatively, user 16 may buy apparatus 10 with a specific voice.

In accordance with the present invention, apparatus 10 is further arranged for scanning written music, preferably with the accompanying tempo notations, cords, and other relevant information. Apparatus 10 is further arranged to produce an audio output of the written music, via a music synthesizer. Preferably, the music synthesizer may selectably produce the sound of a desired instrument, for example, a cello or organ. Preferably, at least one of keys 48 is used to select music synthesis as well as a synthesizer sound. Preferably, user 16 maintains visual contact with the written music, as it is produced, for example, in preparation for playing it.

Figure 8:
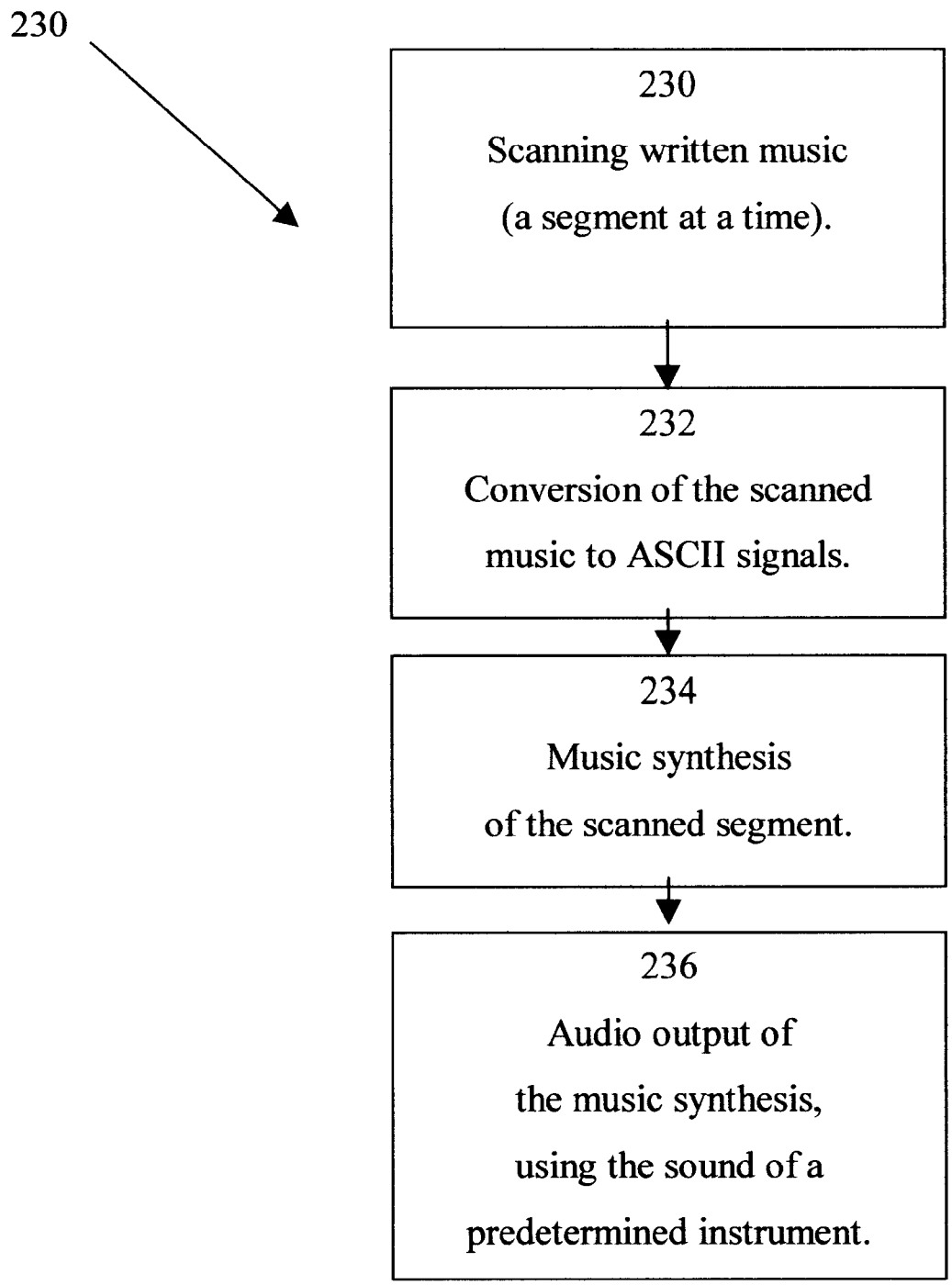
FIG. 8 is a flowchart of a protocol for music synthesis, in accordance with present invention.

Reference is now made to FIG. 8, which is a flowchart 230 of a protocol for using apparatus 10 as a music synthesizer, in accordance with the present invention, as follows:

in box 230, a section of written music, which may include music notes in a specific key, accompanying cords, tempo and other relevant information is scanned by user 16, preferably in sections of musical passages;

in box 232, computerized system 19 performs OCR conversion to the scanned section of written music;

in box 234, computerized system 19 performs a music synthesis of the scanned section, preferably including a synthesis of cords, tempo and other musical information; and in box 236, computerized system 19 provides an audio output of the scanned section.

Reference is again made to FIGS. 1, 2A and 2B, in order to illustrate additional features of apparatus 10, in accordance with the present invention. Preferably, hand-held device 12 includes a pen 64, having a writing tip 65, located in a channel 66. Pen 64 may be selectably deployed and retracted by a slide 68 in a slit 70. Pen 64 may be used for marking up text 14, or for adding comments to text 14 by user 16, as he sees fit. Preferably, writing tip 65 is a conventional, easily obtained writing tip, for example, a graphite rod in a conventional size. In an alternate embodiment, pen 64 may be external to sheath 21. Preferably, apparatus 10 is further arranged to read the writing of its own writing tip 65, when desired.

Additionally, in accordance with the present invention, hand-held device 12 includes a storing component 76, arranged for receiving a removable data storage component 74 such as a diskette, a CD, a cassette tape, or a similar lightweight data storage component, for storing information that was scanned, translated or otherwise produced by computerized system 19. Preferably, components 76 and 74 are miniature, and may be tailor fitted for device 12. User 16 may use microphone 15 to record other messages, which he would like stored with the text, on removable data storage component 74.

Further in accordance with the present invention, hand-held device 12 may include a jack 72 for connecting it to a desktop computer, a laptop computer, a palmtop, a notebook, a mobile telephone, an organizer, and other computerized devices, when desired.

Additionally or alternatively, hand-held device 12 may be arranged as an integral unit with another hand-held computerized device such as a palmtop, a CD player, a cassette player, a mobile telephone, a radio, an organizer, and other computerized devices.

Additionally, in accordance with the present invention, hand-held device 12 may include a clock 84, to help user 16 pace himself.

Further in accordance with the present invention, hand-held device includes a rechargeable battery 50, fitted onto outer sheath 21 through a battery fitting 52. Additionally or alternatively, hand-held device 12 may be connected to the grid, via a power jack 54 and an electric cable (not shown).

Preferably, hand-held device 12 includes an on/off switch 60, to selectably turns apparatus 10 on and off. Preferably, apparatus 10 automatically shuts itself off after a predetermined length of time in which it is not used, for example, 3 or 5 minutes. Alternatively, hand-held device 12 includes a heat-sensor 57, in communication with computerized system 19, for automatically turning apparatus 10 on, when it is hand-held, and for automatically shutting apparatus 10 off, when it is laid down. Alternatively, another known system for automatically turning apparatus 10 on and off may be used.

Preferably, hand-held device 12 includes a gyroscope 86, arranged for gliding across text 14. Gyroscope 86 is in communication with computerized system 19, and informs computerized system 19 when the scanning of a portion of text 14, such as a sentence, has been completed, and OCR conversion should be performed. Alternatively, gyroscope 86 is not used, and computerized system 19 determines when the scanning of a portion of text has been completed, by discerning a pause in the inflow of scanned information. Gyroscope 86 may also be used to automatically turn apparatus 10 on, when it begins to glide across text 14, and to automatically shut apparatus 10 off, when it is not being used for a predetermined length of time.

Preferably, sheath 21 of hand-held device 12 may be opened by unscrewing screws 58, that fit into screw holes 62, for repair or for the installation or replacement of hardware.

In accordance with some embodiments of the present invention, device 12 is held at an oblique angle to text 14, in order to enable user 16 to maintain visual contact with text 14. Preferably, scanning at an oblique angle is achieved through any of the methods taught by U.S. Pat. No. 5,019,699 to Koenck and U.S. Pat. No. 5,834,749 to Durbin, both incorporated herein by reference and described hereinabove, in conjunction with the survey of prior art.

In accordance with an embodiment of the present invention, device 12 is arranged so that the oblique angle at which it is held with respect to text 14 may be varied, to suit user 16. Preferably, correction for the variation in the oblique angle may be performed by computerized system 19, for example, as taught by Koenck and Durbin. Alternatively, photosensitive detector 25 is arranged on a hinge 82 and may be selectably swung to a certain degree to the left or to the right, by moving a notch 78 in a semicircular slit 80. Preferably, photosensitive detector 25 is thus maintained parallel to text 14, regardless of the angle at which device 12 is held with respect to text 14.

However, device 12 may be held so that optical axis X is perpendicular to text 14, without interfering with the ability of user 16 to maintain eye contact with text 14 as it is read aloud by apparatus 10. Since the text-to-speech synthesis is performed after scanning, user 16 may first scan the text, than listen to the text-to-speech synthesis and follow the text with his eyes.

Figure 9A:
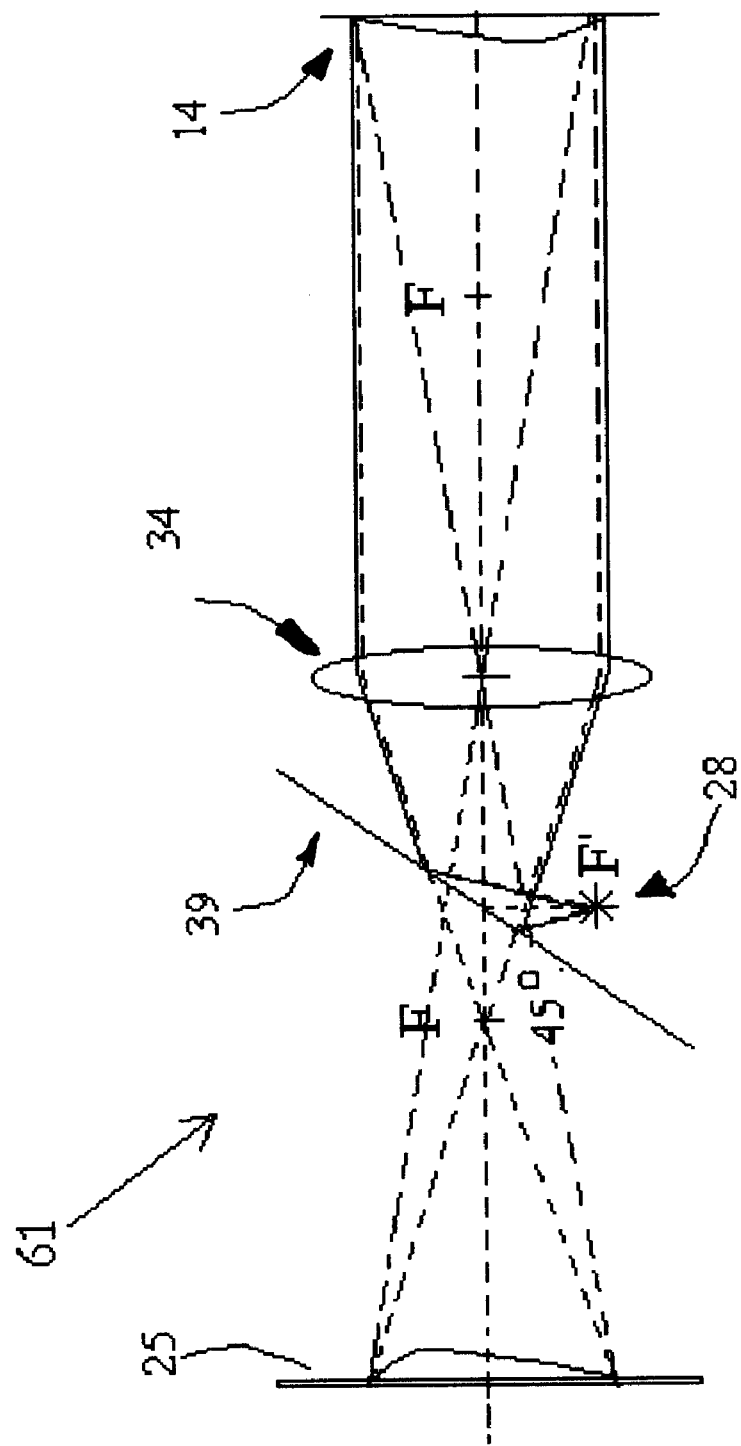
FIGS. 9A–9C schematically illustrate different arrangements of the scanner system, in accordance with the present invention.

Reference is now made to FIG. 9A, which schematically illustrates a scanner 61, in accordance with an embodiment of the present invention, as taught by U.S. Pat. No. 5,200,793, to Ulich et al., and by U.S. Pat. Nos. 6,057,909, 6,091,905, and 6,10,517 to Yahav et al., incorporated herein by reference. Illumination system 28 includes a substantially point light source, arranged behind optical system 34, at a distance from the optical system F', which is substantially equal to the focal distance, F, but off optical axis X, wherein light is bore-sighted with optical axis X with a beam-splitter 39, for producing collimated, even illumination of text 14.

Figure 9B:
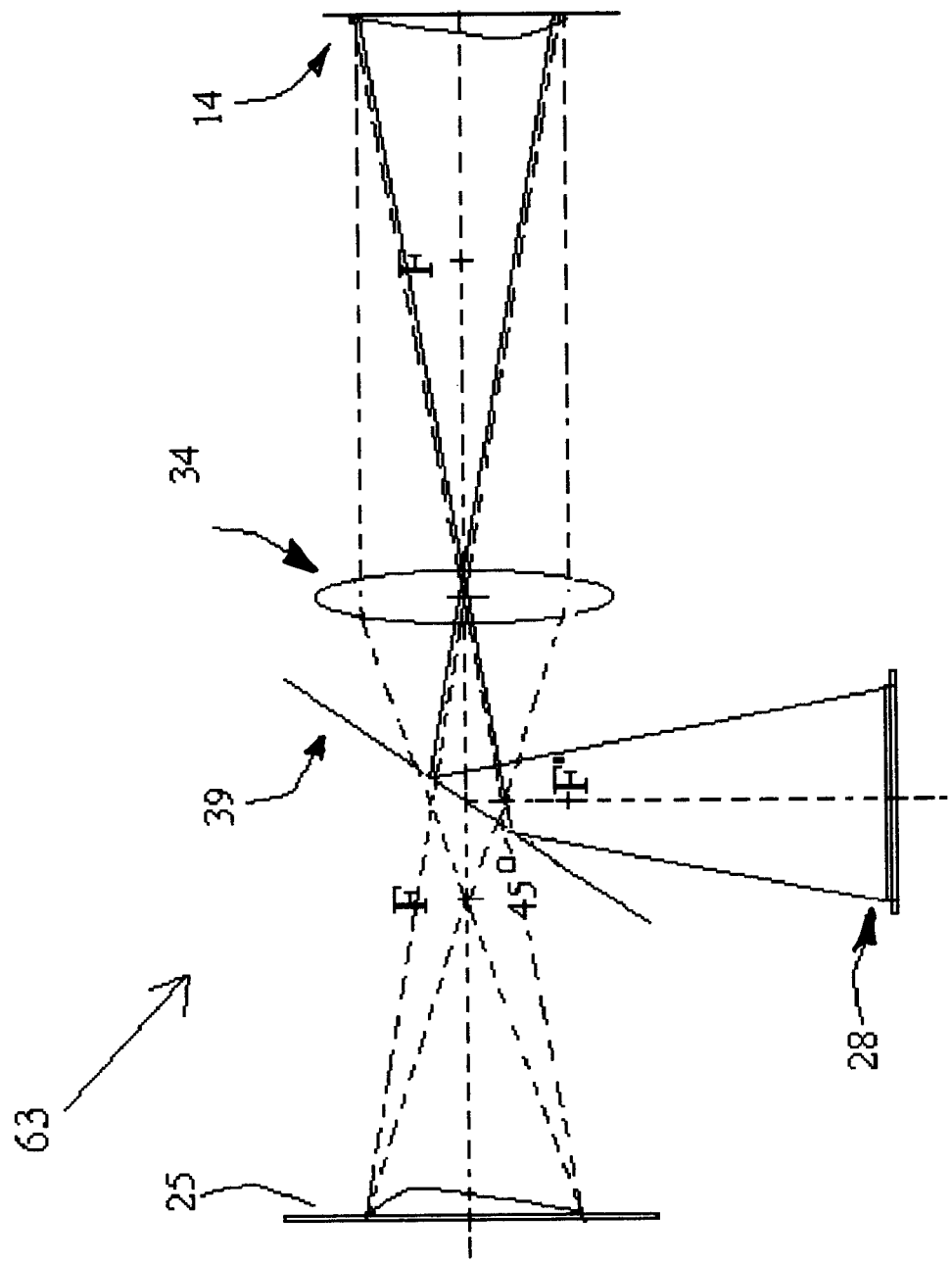

Reference is now made to FIG. 9B, which schematically illustrates a scanner 63, in accordance with another embodiment of the present invention, as taught by Yahav et al. Illumination system 28 includes an area light source whose dimensions are substantially the same as those of photosensitive detector 25, arranged behind optical system 34, at a distance from optical system 34 which is substantially equal to the distance between optical system 34 and photosensitive detector 25, but off optical axis X, wherein light is bore-sighted with optical axis X with beam-splitter 39, for producing a field of illumination which is substantially equal to the field of view. Alternatively, area light source 28 may be of dimensions smaller than those of photosensitive detector 25, but closer to optical system 34, or of dimensions greater than those of photosensitive detector 25, but farther away from optical system 34, while maintaining the condition that the field of view is substantially, or generally the same as the field of illumination. The advantage of this arrangement is that user 16 may easily control the field of view, by varying the field of illumination, which is visible to him.

Figure 9C:
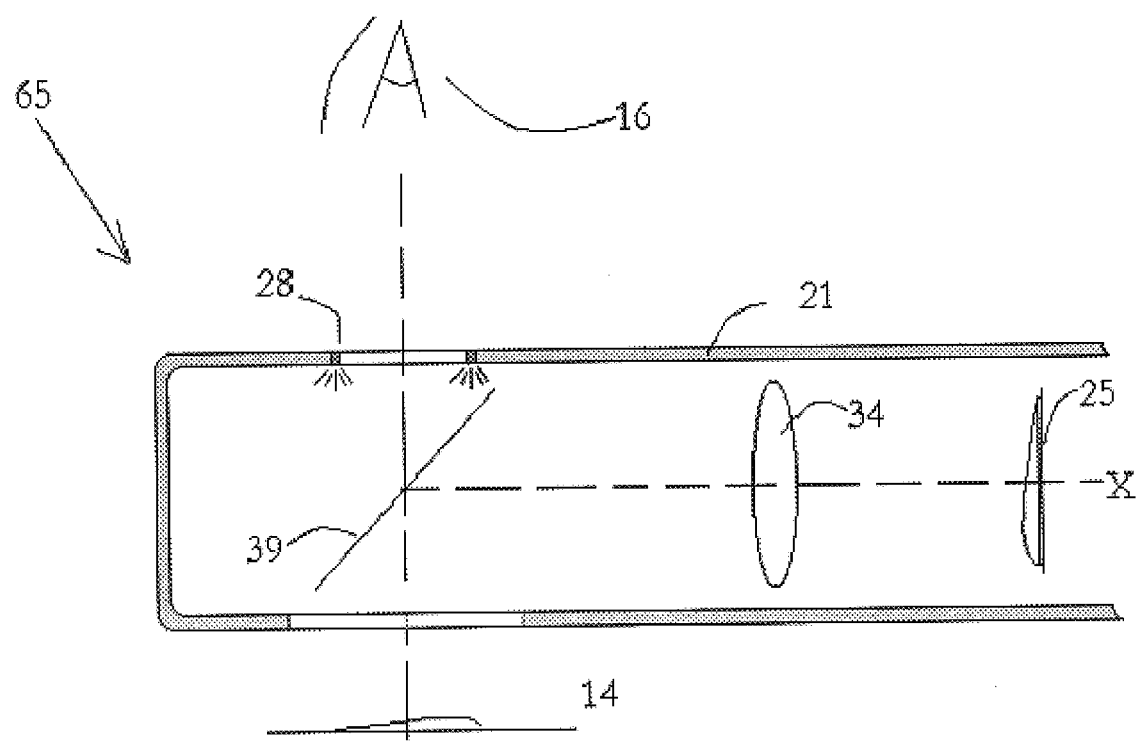

Reference is now made to FIG. 9C, which schematically illustrates a scanner 65, in accordance with still another embodiment of the present invention. User 16 views text 14 through beamsplitter 39, wherein half the reflected illumination reaches user 16 and half is directed to optical system 34 and photosensitive array 25. Alternatively, no optical system is used, and half the reflected illumination reaches user 16 and half is directed to photosensitive array 25, formed as a CIS array.

Preferably hand-held device 12 is pen-like so as to fit comfortably in a hand. Alternatively, another preferably ergonomic design may be used. Preferably, earphones 18 are lightweight so as not to cause a strain on the wearer.

Reference is now made to FIG. 10, which schematically illustrates apparatus 101, in accordance with the present invention. Apparatus 101 includes a first portion 94, which is pen-like, and a second portion 92 which is generally horizontal over the hand holding first portion 94 and which includes display panel 40, keys 48 and on/off switch 60. In this way, user 16 has a better view of display panel 40, as he scans text 14. Preferably, apparatus 101 further includes a flexible portion 93, formed for example, of resilient plastic, for allowing first and second portions 94 and 92 to fold against each other, so apparatus 101 can be easily inserted into a pocket. Alternatively, another folding means may be provided, for example, a hinge.

Apparatus 101 may include a built-in microphone 15, and a built-in speaker 111, which may be used in place of head gear 13 (FIG. 1).

Additionally audio jack 45, may be used for connecting cable 20 to earphones 18 (FIG. 1), a cable 105 to an electric organ, or a cable 107 to an amplifier, a music station, a tape deck, a CD player, or a mobile phone.

Furthermore, apparatus 101 preferably includes a video jack 121, for connecting apparatus 101 to an external display screen, such as a computer display screen, a television, or an oscilloscope via a cable 103. Preferably, apparatus 101 may be arranged to display text 14, as it is scanned, for example, for use in a classroom.

Furthermore, apparatus 101 may include a jack 72 for connecting it to any of a desktop computer, a laptop computer, a palmtop, a mobile telephone, an organizer, and other computerized devices, via a cable 109, when desired.

Reference is now made to FIG. 11, which schematically illustrates apparatus 130, in accordance with an alternate embodiment of the present invention. Apparatus 130 is similar in design to apparatus 101, but its second portion 92 is arranged to be worn around the wrist of user 16 with a wristband 125. The purpose of wristband 125 is to reduce the weight that is carried by the hand of user 16 as he scans a portion of text.

Apparatus 101 and 130 may be used with FIGS. 3–8, in a manner similar to apparatus 10.

It will be appreciated by persons skilled in the art, that the scope of the present invention is not limited by what has been specifically shown and described hereinabove, merely by way of example. Rather, the scope of the invention is limited solely by the claims, which follow.

What is claimed is:

1. A stand-alone, hand-held apparatus, which includes:
    a sheath, having a proximal end with respect to a portion of text in a first language;
    a scanner, located within said sheath, near said proximal end, arranged for scanning the portion of text, in the first language, wherein the portion of text is selected from the group consisting of al least one clause, at least one sentence, and at least two sentences;
    a computerized system, located within said sheath, in communication with said scanner, arranged for performing:
        i. an OCR conversion of the scanned text, in the first language; and
        ii. an automatic translation to a second language, of the scanned text; and
    at least one output system, in communication with said computerized system, for providing a translation in-context to a fragment of the portion of text, wherein the fragment is selected from the group consisting of a word and a phrase, and wherein said translation in-context to the fragment is based on said automatic translation.

2. The Apparatus according to claim 1, wherein said at least one output system includes an audio-output system.

3. The apparatus according to claim 1, wherein said at least one output system includes a visual display.

4. The apparatus according to claim 1, wherein said at least one output system is adapted for producing said automatic translation, in a complete form.

5. The apparatus according to claim 1, and further including a user interface system, in communication with said computerized system, for enabling a user to communicate with said apparatus.

6. The apparatus according to claim 1, wherein said computerized system is further arranged for performing a text-to-speech synthesis of the scanned text, and wherein said at least one output system is further adapted for audibly producing said text-to-speech synthesis.

7. A stand-alone, hand-held apparatus, which includes:
    a sheath, having a proximal end with respect to a portion of text in a first language;
    a scanner, located within said sheath near said proximal end, arranged for scanning the portion of text, in the first language, wherein the portion of text is selected from the group consisting of at least one clause, at least one sentence, and at least two sentences;
    a computerized system, located within said sheath, in communication with said scanner, arranged for performing:
        i. an OCR conversion of the scanned text, in the first language;
        ii. a text-to-speech synthesis of the scanned text, in the first language; and
        iii. an automatic translation to a second language, of the scanned text; and
    at least one output system, in communication with said computerized system, for providing in-tandem exposure to spoken and translated forms of the portion of text.

8. The apparatus according to claim 7, wherein said at least one output system includes an audio-output system, and wherein said text-to-speech synthesis, in the first language, and said automatic translation, in the second language, are produced via said audio-output system, in sequence.

9. The apparatus according to claim 8, wherein said audio-output system includes an audio output rate control.

10. The apparatus according to claim 8, wherein said audio-output system includes a library of voices, from which a voice may be selected for an audio output.

11. The apparatus according to claim 8, wherein said audio-output system includes a library of voices, from which a first voice may be selected for said text-to-speech synthesis, and a second voice may be selected for said automatic translation.

12. The apparatus according to claim 7, wherein said at least one output system includes an audio output system and a visual display, and wherein said text-to-speech synthesis, in the first language, is produced audibly, and said automatic translation, in the second language, is displayed.

13. The apparatus according to claim 7, wherein said at least one output system is further adapted for producing a translation in-context of a fragment of the portion of text, wherein the fragment is selected from the group consisting of a word and a phrase, and wherein said translation in-context is based on said automatic translation.

14. The apparatus according to claim 7, and further including a user interface system, in communication with said computerized system, for enabling a user to communicate with said apparatus.

15. The apparatus according to claim 7, and further including a microphone, wherein said computerized system is further arranged for recording speech.

16. The apparatus according to claim 7, wherein said apparatus may be further arranged for performing an OCR conversion and a text-to-speech synthesis of a portion of text in the second language, and an automatic translation to the first language.

17. A method of providing in-tandem exposure to spoken and translated forms of a portion of text, said method including:
    scanning a portion of text, selected from the group consisting of at least one clause, at least one sentence, and at least two sentences;
    performing an OCR conversion of the scanned text, in a first language;
    performing a text-to-speech synthesis of the scanned text in the first language;

producing an audio output of said text-to-speech synthesis, in the first language;

performing an automatic translation of the scanned text, to a second language;

producing an output of said automatic translation, in the second language, thus providing said in-tandem exposure to spoken and translated forms of the portion of text.

18. A stand-alone, hand-held apparatus for teaching correct pronunciation, which includes:

a sheath, having a proximal end with respect to a portion of text;

a scanner, located within said sheath, near said proximal end, arranged for scanning the portion of text;

a computerized system, located within said sheath, in communication with said scanner, arranged for performing an OCR conversion and a text-to-speech synthesis of the scanned text;

a microphone and an audio recording system, in communication with said computerized system, for recording a user's pronunciation of the scanned text;

an audio-output system, in communication with said computerized system, for producing audio outputs of said text-to-speech synthesis and of the user's pronunciation of the scanned text;

a signal evaluation software, for comparing said text-to-speech synthesis and the user's pronunciation of the scanned text, and a display, for displaying an output of said signal evaluation software.

19. A method for teaching correct pronunciation, which includes:

scanning a portion of text, selected from the group consisting of at least one clause, at least one sentence, and at least two sentences;

performing an OCR conversion to the scanned text;

performing a text-to-speech synthesis of the scanned text;

producing an audio output of the text-to-speech synthesis;

recording a user's pronunciation of the scanned text;

playing back the user's pronunciation of the scanned text; and comparing the user's pronunciation of the scanned text with the audio output of the text-to-speech synthesis.

20. The method of claim 19, wherein comparing includes comparing audibly.

21. The method of claim 19, wherein comparing includes comparing by a signal evaluation software.

22. A method for providing a translation in-context, which includes:

scanning a portion of text, selected from the group consisting of at least one clause, at least one sentence, and at (east two sentences;

performing an OCR conversion to the scanned text;

performing an automatic transition of the scanned text, to a second language; and providing a translation in-context to a fragment of the portion of text, wherein the fragment is selected from the group consisting of a word and a phrase, and wherein said translation in-context to the fragment is based on said automatic translation.

* * * * *